US008992773B2

(12) United States Patent
Marheine

(10) Patent No.: US 8,992,773 B2
(45) Date of Patent: Mar. 31, 2015

(54) MOBILE OIL FILTRATION UNIT

(75) Inventor: Philip Charles Marheine, Rutherford (AU)

(73) Assignee: Filter Technology Australia Pty Ltd., Queensland (AU)

( * ) Notice: Subject to any disclaimer, the term of this patent is extended or adjusted under 35 U.S.C. 154(b) by 576 days.

(21) Appl. No.: 11/917,796

(22) PCT Filed: Jun. 19, 2006

(86) PCT No.: PCT/AU2006/000855
§ 371 (c)(1),
(2), (4) Date: Feb. 11, 2008

(87) PCT Pub. No.: WO2006/133520
PCT Pub. Date: Dec. 21, 2006

(65) Prior Publication Data
US 2008/0277325 A1    Nov. 13, 2008

(30) Foreign Application Priority Data
Jun. 17, 2005   (AU) ................................ 2005903180

(51) Int. Cl.
*B01D 35/26* (2006.01)
*B01D 36/02* (2006.01)
*A47J 37/12* (2006.01)
*A47J 43/28* (2006.01)
*B01D 29/56* (2006.01)

(52) U.S. Cl.
CPC ................ *B01D 29/56* (2013.01); *B01D 35/26* (2013.01); *B01D 36/02* (2013.01); *B01D 2201/265* (2013.01)

USPC ................... 210/167.28; 210/241; 210/257.1; 210/416.1

(58) Field of Classification Search
USPC ......................... 210/167.28, 257.1, 416.1, 241
See application file for complete search history.

(56) References Cited

U.S. PATENT DOCUMENTS

| | | | | |
|---|---|---|---|---|
| 2,425,848 A | * | 8/1947 | Vawter | 210/167.31 |
| 2,733,815 A | * | 2/1956 | Kwochka et al. | 210/316 |
| 2,902,161 A | * | 9/1959 | Humbert, Jr. et al. | 210/416.5 |
| 3,263,818 A | * | 8/1966 | Gedrich | 210/416.5 |
| 3,279,605 A | * | 10/1966 | Shepherd | 210/110 |
| 3,355,026 A | * | 11/1967 | Schut | 210/416.5 |
| 3,400,824 A | * | 9/1968 | Weimer et al. | 210/238 |
| 3,616,907 A | * | 11/1971 | Van Vleet | 210/808 |
| 3,630,361 A | * | 12/1971 | Keating | 210/85 |
| 3,707,907 A | * | 1/1973 | Wilson et al. | 99/408 |
| 4,095,673 A | * | 6/1978 | Takeuchi | 184/1.5 |
| 4,113,623 A | * | 9/1978 | Koether et al. | 210/167.28 |

(Continued)

FOREIGN PATENT DOCUMENTS

| | | |
|---|---|---|
| EP | 0 241 617 | 10/1987 |
| EP | 0 381 355 | 8/1990 |

(Continued)

*Primary Examiner* — Thomas M Lithgow
(74) *Attorney, Agent, or Firm* — Young & Thompson

(57) ABSTRACT

A portable oil filtration unit 10 comprising a tank section 11 and a pump and filter unit 12 and an electrical control box 13. Operational switches are illustrated generally at 14. The unit is equipped with an inlet lance or wand 15 and an outlet lance or wand 16. The lances are located in position so that the lances have their ends at the bottom of a tank located in the tank housing 11. Thus when the unit is in a filtration mode and the pump turned on, oil will circulate from the tank through each of the lances and through the filtration unit.

12 Claims, 6 Drawing Sheets

(56) References Cited

U.S. PATENT DOCUMENTS

| | | | |
|---|---|---|---|
| 4,282,094 A * | 8/1981 | Mitchell | 210/167.28 |
| 4,513,614 A * | 4/1985 | Adcock | 73/169 |
| 4,517,082 A * | 5/1985 | Prudhomme | 210/117 |
| 4,591,434 A * | 5/1986 | Prudhomme | 210/117 |
| 4,623,455 A * | 11/1986 | Adcock | 210/167.04 |
| 4,702,827 A * | 10/1987 | Wenzel | 210/117 |
| 4,768,426 A * | 9/1988 | Nett | 99/408 |
| 4,959,144 A * | 9/1990 | Bernard et al. | 210/232 |
| 4,991,608 A * | 2/1991 | Schweiger | 134/56 R |
| 5,139,678 A * | 8/1992 | Frederick et al. | 210/641 |
| 5,228,985 A * | 7/1993 | Wells et al. | 210/167.28 |
| 5,247,876 A * | 9/1993 | Wilson et al. | 99/408 |
| 5,340,471 A * | 8/1994 | Wilson et al. | 210/167.28 |
| 5,417,851 A * | 5/1995 | Yee | 210/167.01 |
| 5,597,601 A * | 1/1997 | Griffin | 426/417 |
| 5,617,777 A * | 4/1997 | Davis et al. | 99/408 |
| 5,839,360 A * | 11/1998 | Williams | 99/408 |
| 5,870,945 A * | 2/1999 | Bivens | 99/408 |
| 6,022,473 A * | 2/2000 | Mickelson | 210/86 |
| 6,202,543 B1* | 3/2001 | Moya et al. | 99/330 |
| 6,207,051 B1* | 3/2001 | Anderson et al. | 210/237 |
| 6,235,210 B1* | 5/2001 | Saksena | 210/791 |
| 6,306,294 B1* | 10/2001 | Blair | 210/167.28 |
| 6,330,852 B1* | 12/2001 | Williams | 99/408 |
| 2004/0058043 A1* | 3/2004 | More | 426/438 |
| 2006/0065582 A1* | 3/2006 | Bell | 210/167 |
| 2007/0266679 A1* | 11/2007 | Horne | 55/356 |
| 2009/0078659 A1* | 3/2009 | Whitlock et al. | 210/773 |

FOREIGN PATENT DOCUMENTS

| | | |
|---|---|---|
| GB | 1 426 323 | 2/1976 |
| GB | 2 146 547 | 4/1985 |

* cited by examiner

MOBILE OIL FILTRATION UNIT

FIELD OF THE INVENTION

THIS INVENTION relates to a mobile oil filtration unit and in particular but not limited to a mobile oil filtration unit for filtration of cooking oil on site.

BACKGROUND TO THE INVENTION

Regular and periodic filtration of cooking oil can extend the oils useful life by removing water and food particles. Portable cooking oil filters are known. For example, EP 241617 to FRYMASTER CORPORATION describes a portable unit where oil is removed from a cooker filtered in the unit and then returned to the cooker. Similar units are described in U.S. Pat. No. 5,870,945 to BIVENS; GB 2,146, 547 to RENOVAT CLEANING AND FILTERING SERVICES(AUSTRALIA) PTY LTD; GB 1,426,323 to WHITESIDE; EP 381355 to FILTERCORP INC; U.S. Pat. No. 5,597, 601 to GRIFFIN; U.S. Pat. No. 5,340,471 to WILSON ET AL; US 2004/0058043 to MORE.

All of these units filter the oil but have variations as to the unit structure and processing of the oil through the unit. As a result of these structural and processing variations each unit has its own advantages and disadvantages and in particular lack simplicity. U.S. Pat. No. 5,870,945 and US 2004/0058043 use of an inlet wand but this is not part of a circulation stream through the filters. U.S. Pat. No. 5,340,471 uses a single wand but has no circulation capability using a reversible pump to return filtered oil. U.S. Pat. No. 5,597,601 uses a single wand but unlike other units lacks an onboard storage tank.

EP 381355 uses a single wand. GB 1,426,323 does not have an onboard storage tank and uses a single process line and has no circulation capability. U.S. Pat. No. 5,870,945 does not use an inlet wand and has an open topped tank. Circulation within the unit is via an outlet wand. The inlet wand is effectively an extension of the open topped tank. The tank is filled under gravity. The filter is contained inside the tank. GB 146 547 uses a single wand, does not have a circulation capability using reversible pump. EP 241617 uses a single wand while US 2004/0058043 has circulation via a valve system.

OBJECT OF THE INVENTION

An object of the present invention is to provide a portable oil filtration unit which is structurally different to the above-mentioned prior art and at the very least provides the public with a simple, effective, easy to use and useful alternative.

OUTLINE OF THE INVENTION

In one aspect there is provided a portable oil filtration unit comprising a tank, a pump and a filter means, an inlet and an outlet all mounted on a wheel assembly, the unit being adapted to draw oil into the unit from an external source through the inlet and then circulate oil through the tank and filter means and back to the tank and subsequently enable return of filtered oil from the tank through the outlet characterised in that, the unit has a circulation mode of operation where oil travels around a circulation path including the outlet. Preferably the inlet is used to draw oil from an external source and also provides a circulation path during the filtration process. Preferably the outlet provides a return path to the tank during the circulation phase and also provides the outlet for return of the oil to the external source.

Preferably, the inlet and outlet comprises manually operable inlet and outlet wands having respective ends and the tank includes wand holders adapted to locate the ends of the wands in oil in the tank during the circulation mode of operation. The wands may be manually moved from the wand holders to the external source in order to fill or empty the tank.

The external source is typically an oil vat in a cooking establishment. Oil is typically drawn from the vat into the tank via the inlet want which is temporarily located in the vat in order to fill the tank. The outlet wand remains located in the tank. Oil is initially passed through the inlet wand, through the filter means, through the outlet wand and into the tank. Once all oil is located in the tank, the inlet wand is returned to the inlet wand holder in the tank and the oil is circulated several times through the filter means via the inlet wand and outlet wand prior to being returned to the vat through the outlet wand. The outlet wand is moved from the outlet wand holder in the tank to be temporarily located in the vat for the purpose of return of oil to the vat.

There is no requirement for valves to be operated or for the pump to be reversed. The unit is isolated form the external source during the circulation mode. This has the advantage that oil that is too old may be disposed of using the tank in the unit as the disposal tank.

It is preferable that the unit operates with the oil at operating temperature. In order to utilise the unit most efficiently heaters are typically employed on the pump filtration means and any pre-strainer and heating means are not utilised in the tank. Typically, the unit has a number of operational phases, firstly at initial start up the unit enters into a heating cycle to heat the pump, the filtration means and any upstream strainer. Once the unit has reached operating temperature, the pump may be switched on to either circulate oil held in the tank, return oil held in the tank to an external source or draw fresh oil to be filtered into the tank through the inlet.

The filter means typically comprises an upstream strainer basket and a downstream filter, the downstream filter preferably comprising a paper roll filter. Preferably, the unit includes a strainer access and a separate filter access so that the filter and strainer may be independently accessed for cleaning or replacement. Typically, the access comprises respective removable caps.

BRIEF DESCRIPTION OF THE DRAWINGS

In order that the present invention may be more readily understood and be put into practical effect, reference will now be made to the accompanying drawings which illustrate a preferred embodiment of the invention and wherein:—

METHOD OF PERFORMANCE

Figure 1:
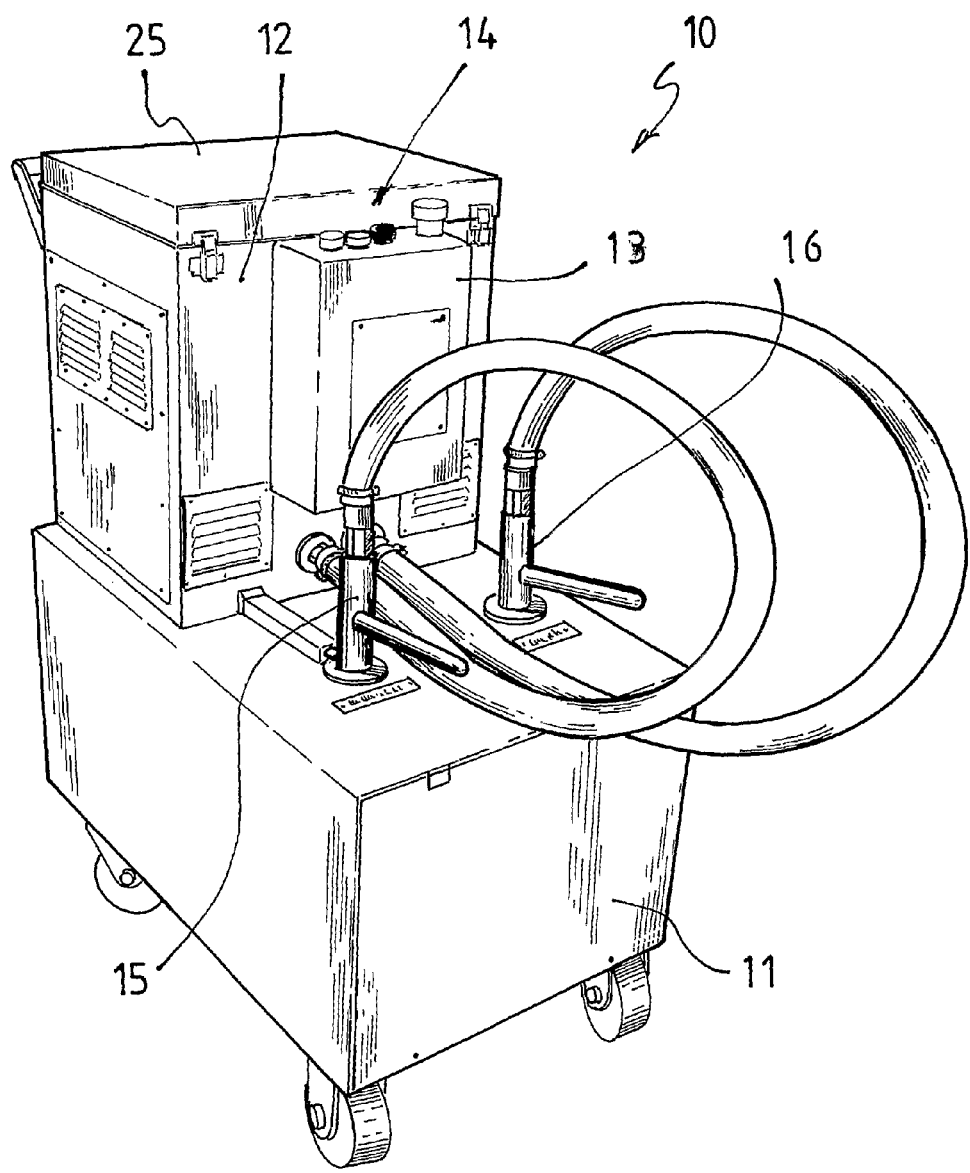
FIG. 1 is a perspective drawing illustrating a mobile unit according to a preferred form of the present invention.

Referring to the drawings and initially to FIG. 1 there is illustrated a portable oil filtration unit 10 comprising a tank section 11 and a pump and filter unit 12 and an electrical control box 13. Operational switches are illustrated generally at 14. The unit is equipped with an inlet lance or wand 15 and an outlet lance or wand 16. As can be seen in FIG. 1, the lances are located in position so that the lances have their ends at the bottom of a tank located in the tank housing 11. Thus when the lances are so positioned and the unit is in a filtration mode and the pump turned on, oil will circulate from the tank through each of the lances and through the filtration unit. This will be described in greater detail below.

Figure 2:
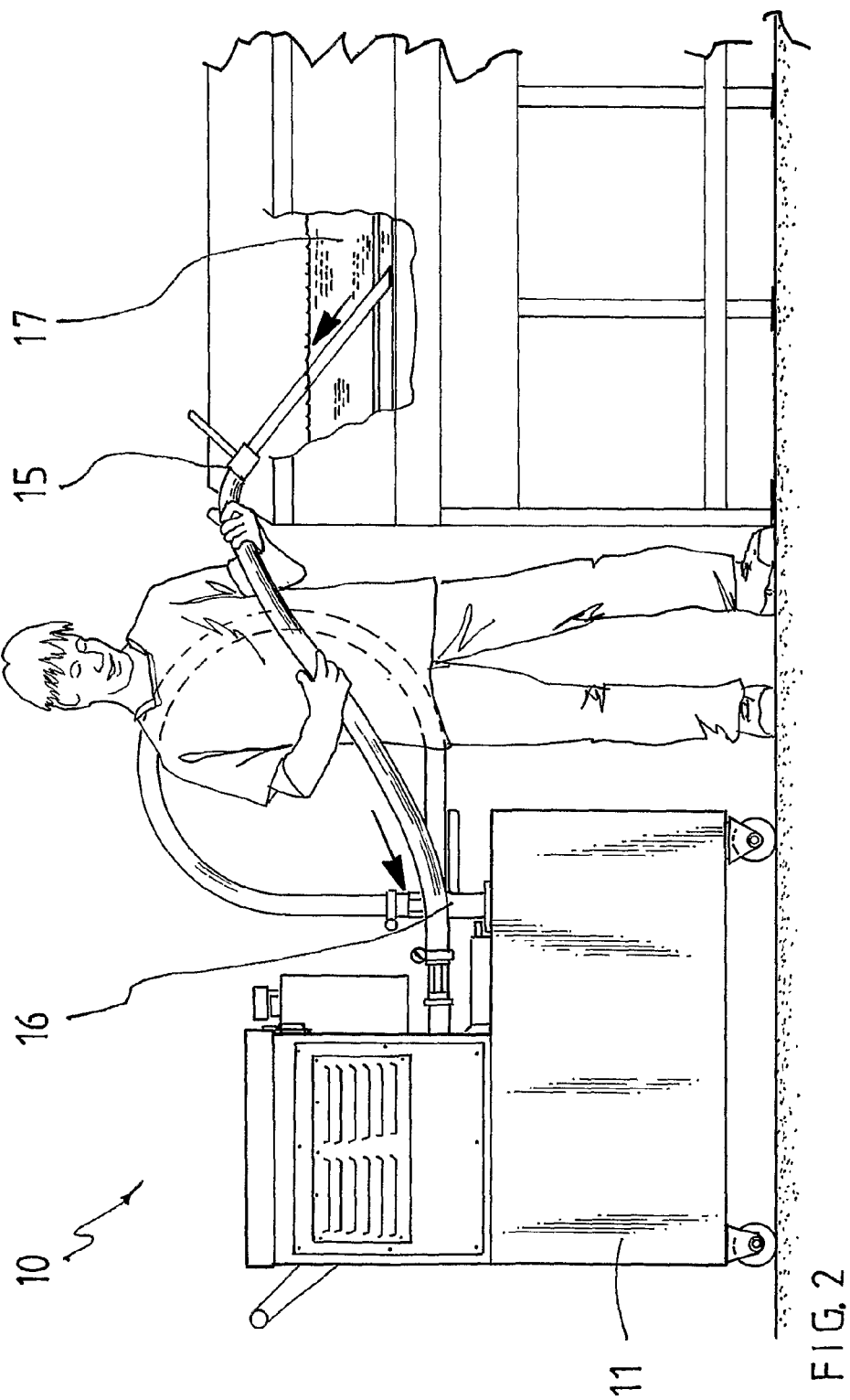
FIG. 2 is a drawing illustrating operation of the unit filling the tank of the unit from an external vat.

Referring now to FIG. 2 there is illustrated unit 10 being used to drain oil from a vat 17 into the tank section 11. The lance 15 has been placed into the oil and the pump turned on and the hot oil travels through the pump section, through the pump, through a strainer and through a filter, finally ending up having traveled through the outlet lance 16 the oil completes its travel into the tank and the tank progressively fills. Once the vat 17 is empty, the lance 15 is returned to its position in the unit and the pump may then be switched on again to circulate oil through the filtration system.

Figure 3:
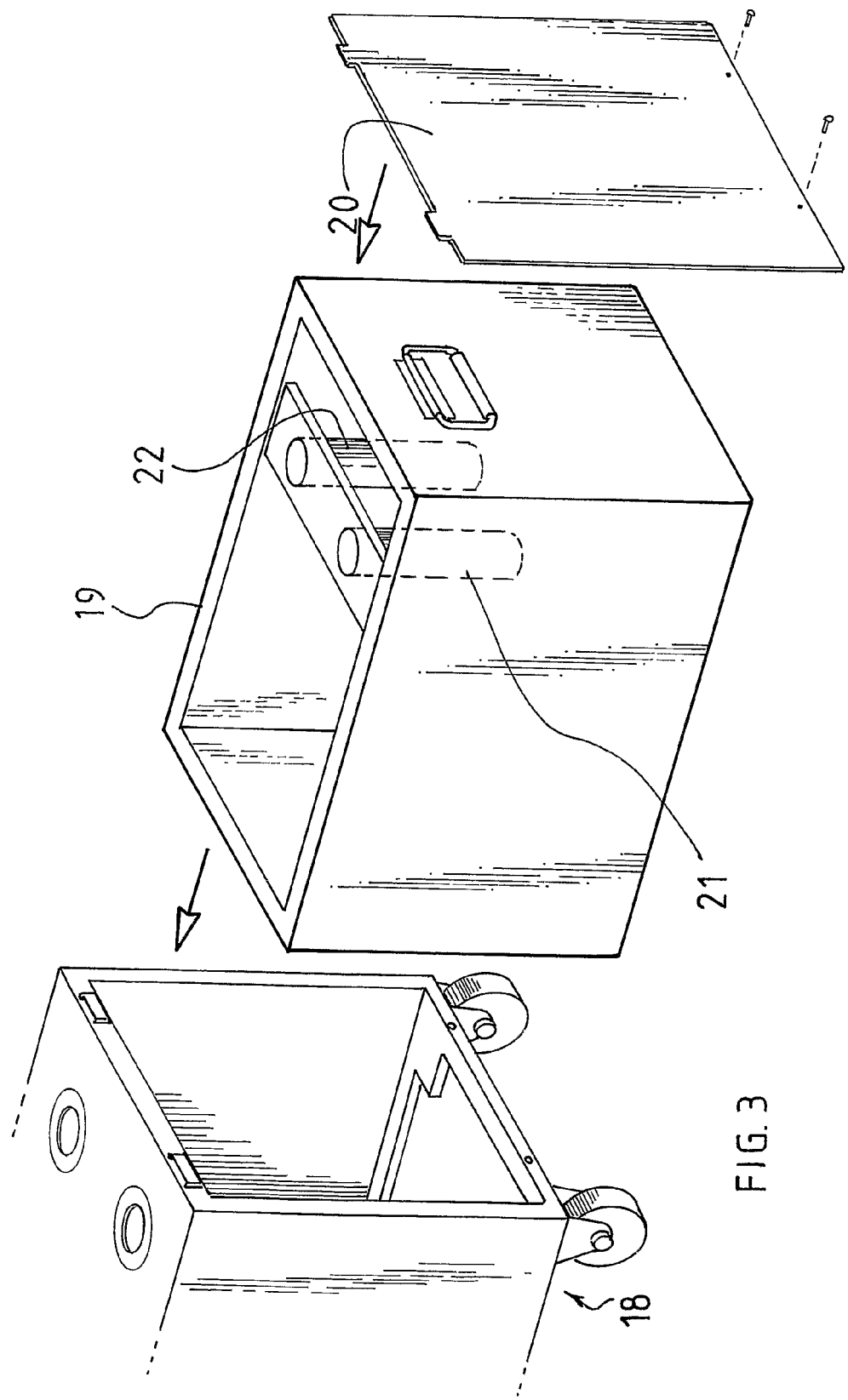
FIG. 3 is an exploded drawing illustrating preferred assembly of the tank in the unit so that the tank may be removed and clean.

As can be seen in FIGS. 1 and 3 the unit includes a carriage assembly 18 and the tank 19 fits inside the carriage assembly and a door 20 is positioned in place as shown. Lance holders 21 and 22 are positioned as shown so that the ends of the lances when in the holders are positioned in the bottom of the tank 19.

Figure 4:
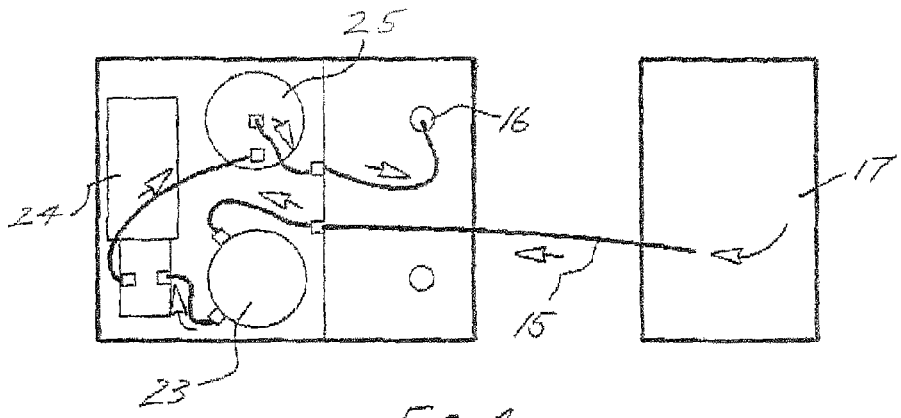
FIGS. 4, 5 and 6 illustrate respectively oil being drawn from an external source into the tank; oil being drained from the tank back to the external source; and filtration phase where oil is circulated from the tank back to the tank several times through the filter means.
Figure 5:
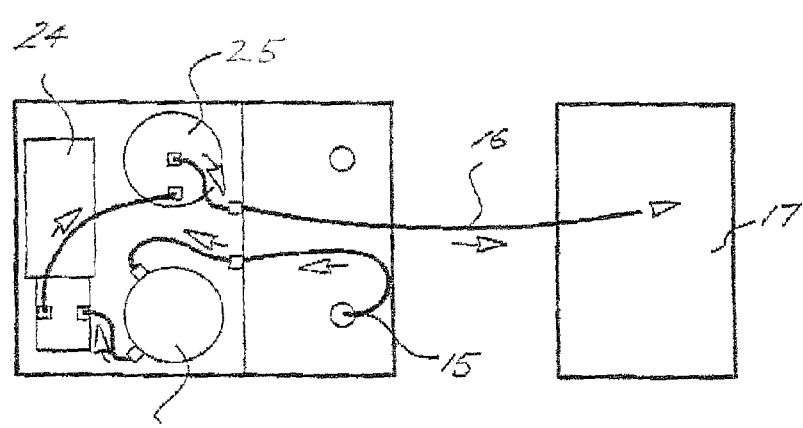
Figure 6:
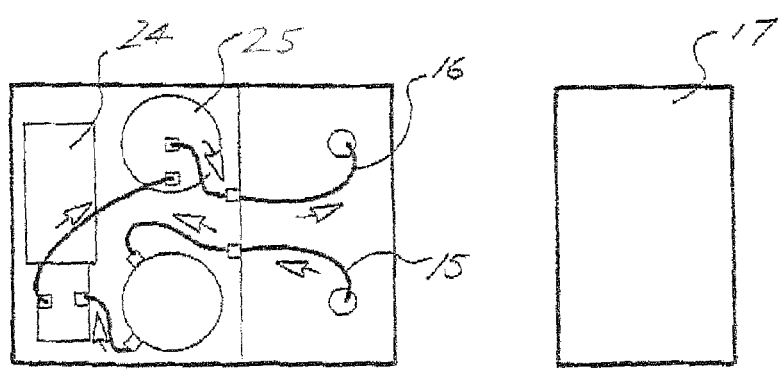
Figure 7:
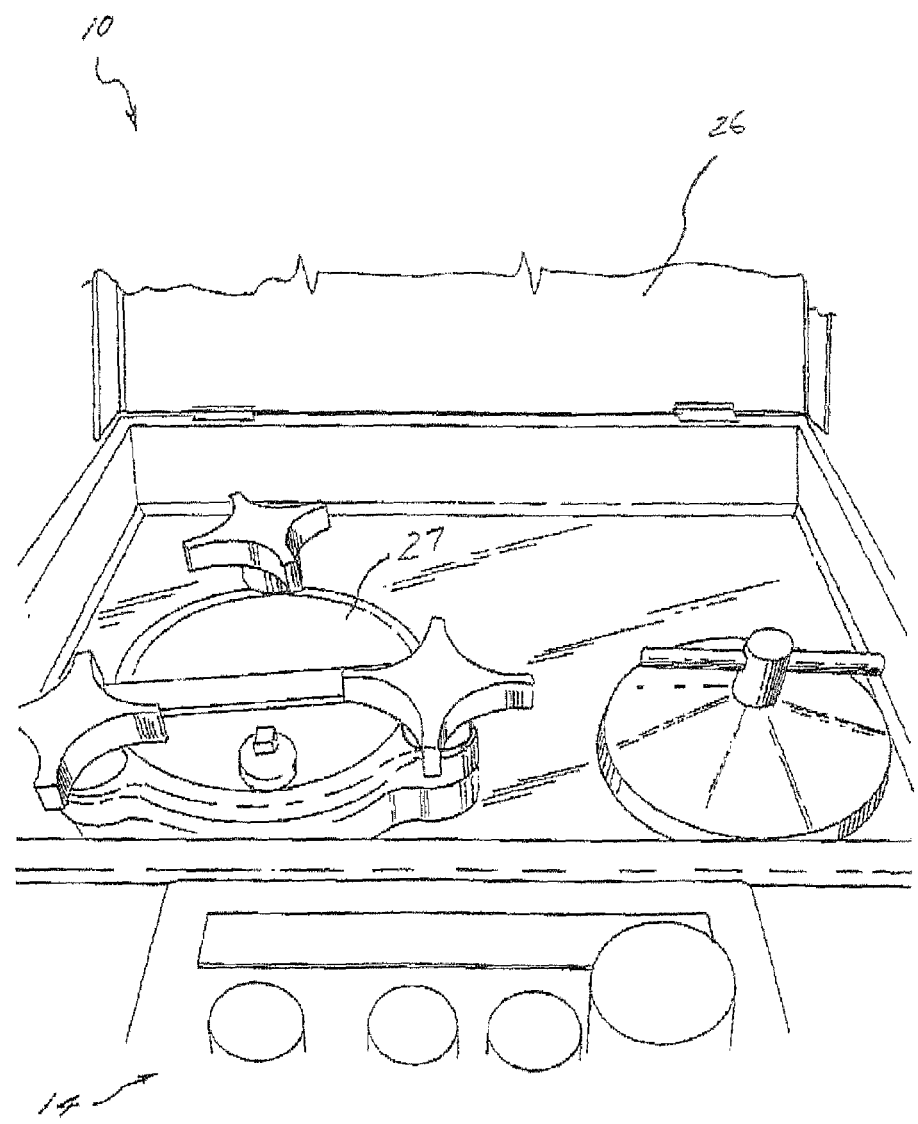
FIG. 7 illustrates the closure and cap arrangement holding the strainer and filter.

FIG. 4 illustrates the circulation of oil as occurs according to the illustration of FIG. 2 and like numerals have been used to illustrate like features. The oil travels in through the inlet 15, through a gauze or wire strainer assembly 23 to remove large particulars and thence through pump 24 and onto the fine paper filter 25 before being returned to the tank 19 via the outlet lance 16. Once all oil has been removed from the vat 17 the lance 15 is returned to its holder as illustrated in FIG. 6, the pump started and oil circulated continuously through the filter 25, pump 24 and strainer assembly 23 to remove small particles from the oil. Once the filtration cycle has been completed oil is returned to the vat 17 through the outlet lance 16 as illustrated in FIG. 5 until the tank 19 is empty.

Figure 8:
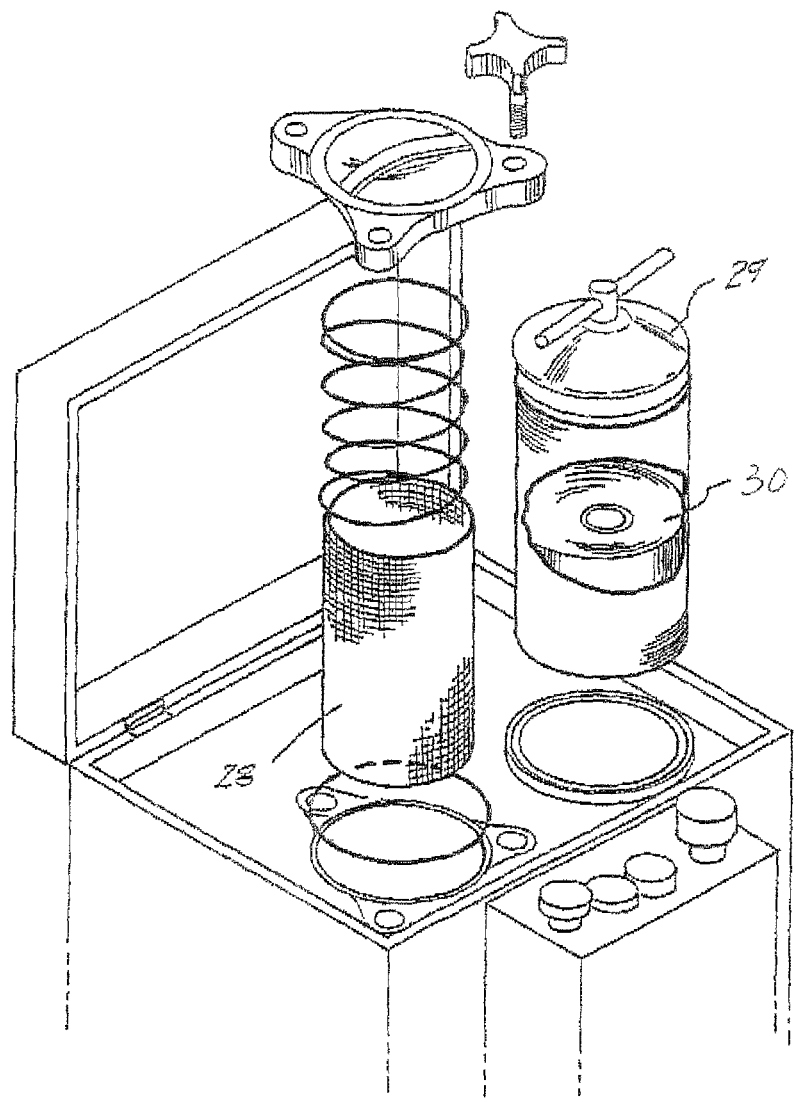
FIG. 8 illustrates in exploded form the filter and the strainer as assembled and inserted into the unit.

In order to clean the screen assembly 23 and replace the filter element of the filter 25, lid 26 is lifted and the cover 27 is removed to reveal the strainer 28 which may be removed and cleaned in accordance with the illustration of FIG. 8. Likewise, filter rolls, one of which is illustrated at 30, may be replaced by removing the cap 29.

Whilst the above has been given by way of illustrative example of the present invention many variations and modifications thereto will be apparent to those skilled in the art without departing from the broad ambit and scope of the invention as set out in the claims.

The invention claimed is:

1. A portable oil filtration unit, comprising:
   a tank;
   a pump;
   a filter unit comprising a strainer assembly and a paper filter roll downstream of the strainer assembly;
   an inlet;
   an outlet; and
   flow paths within the filter unit,
   the tank, the pump, the filter unit, the inlet and the outlet are all mounted on a wheel assembly, the filtration unit being adapted to draw oil into the filtration unit from an external source through the inlet and then circulate oil through the tank and the filter unit and back to the tank and subsequently enable return of filtered oil from the tank through the outlet,
   wherein the filtration unit has a circulation mode of operation where oil travels around a circulation path including the outlet, inlet, the strainer assembly, the paper filter roll and the tank, and the inlet and outlet comprise manually operable inlet and outlet wands having respective ends and the tank includes wand holders adapted to locate the ends of the wands in oil in the tank during the circulation mode of operation.

2. The portable oil filtration unit according to claim 1, wherein the filtration unit operates with the oil at operating temperature.

3. The portable oil filtration unit according to claim 1, wherein the filtration unit has a number of operational phases, firstly at initial start up the filtration unit enters into a heating cycle to heat the pump in order to heat oil flowing through the pump, the filter unit and the strainer, once the filtration unit has reached operating temperature, the pump is switched on to either circulate oil held in the tank, return oil held in the tank to the external source or draw fresh oil to be filtered into the tank through the inlet.

4. The portable oil filtration unit according to claim 1, wherein the pump is heated in order to heat oil flowing through the pump and the filter unit is heated in order to heat oil flowing through the filter unit.

5. The portable oil filtration unit according to claim 1, wherein the filtration unit includes a strainer access and a separate filter access so that the filter and strainer may be independently accessed for cleaning or replacement.

6. The portable oil filtration unit according to claim 1, wherein the filtration unit includes a carriage assembly and the tank removably fits inside the carriage assembly.

7. A portable oil filtration unit, comprising:
   a tank;
   a pump;
   a filter including a paper filter roll;
   an inlet; and
   an outlet,
   the tank, the pump, the filter, the inlet and the outlet are all mounted on a wheel assembly, the unit being adapted to draw oil into the unit from an external source through the inlet and then circulate oil through the tank and the filter and back to the tank and subsequently allow return of filtered oil from the tank through the outlet,
   wherein the unit has a circulation path corresponding to a circulation mode of operation where oil travels around the circulation path including in series the outlet, the tank and the inlet, and
   the inlet and outlet comprises manually operable inlet and outlet wands having respective ends, and the tank includes wand holders adapted to locate the ends of the wands in oil in the tank during the circulation mode of operation.

8. The portable oil filtration unit according to claim 7, wherein the unit includes a carriage assembly and the tank removably fits inside the carriage assembly.

9. A portable oil filtration unit, comprising:
   a tank;
   a pump;
   a filter including a paper filter roll;
   an inlet; and
   an outlet,
   the tank, the pump, the filter, the inlet and the outlet are all mounted on a wheel assembly, the unit being adapted to draw oil into the unit from an external source through the inlet and then circulate oil through the tank and the filter and back to the tank and subsequently allow return of filtered oil from the tank through the outlet, wherein the unit has a circulation path corresponding to a circulation mode of operation where oil travels around the circulation path including in series the outlet, the tank and the inlet, and the inlet and outlet comprises manually operable inlet and outlet wands having respective ends and the tank includes wand holders adapted to locate the ends of the wands in oil in the tank during the circulation mode of operation, the wands being manually movable from the wand holders to the external source in order to fill or empty the tank.

10. The portable oil filtration unit according to claim 9, wherein the unit includes a carriage assembly and the tank removably fits inside the carriage assembly.

11. A portable oil filtration unit, comprising:
a tank;
a pump;
a filter including a paper filter roll;
an inlet; and
an outlet,
the tank, the pump, the filter, the inlet and the outlet are all mounted on a wheel assembly, the unit being adapted to draw oil into the unit from an external source through the inlet and then circulate oil through the tank and the filter and back to the tank and subsequently allow return of filtered oil from the tank through the outlet, wherein the unit has a circulation path corresponding to a circulation mode of operation where oil travels around the circulation path including in series the outlet, the tank and the inlet, and the inlet and outlet comprises manually operable inlet and outlet wands having respective ends and the tank includes wand holders adapted to locate the ends of the wands in oil in the tank during the circulation mode of operation, and further wherein the unit is arranged such that oil is initially drawn from the external source into the tank via the inlet wand which is temporarily located in the external source, the outlet wand remaining located in the tank, oil is initially passed through the inlet wand, through the filter, through the outlet wand and into the tank, the inlet wand is subsequently returned to the inlet wand holder in the tank and the oil is circulated several times through the filter via the inlet wand, tank and outlet wand is subsequently moved from the outlet wand holder in the tank to be temporarily located in the external source for a purpose of return of oil to the external source through the outlet wand.

12. The portable oil filtration unit according to claim 11, wherein the unit includes a carriage assembly and the tank removably fits inside the carriage assembly.

\* \* \* \* \*